T. WINIECKI.
EDUCATIONAL APPLIANCE.
APPLICATION FILED OCT. 10, 1913.
1,142,651.
Patented June 8, 1915.
2 SHEETS—SHEET 1.
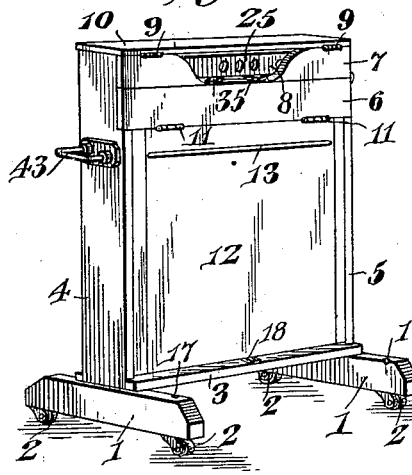
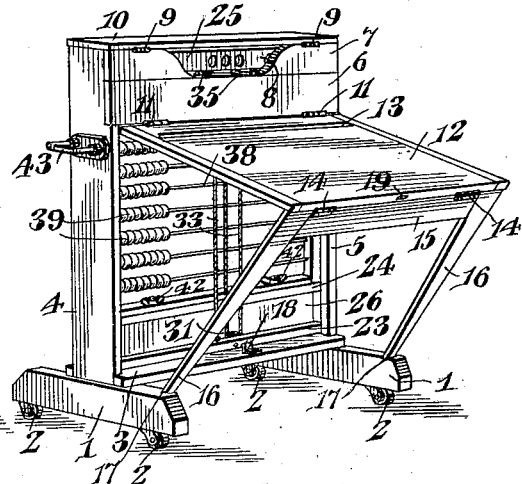
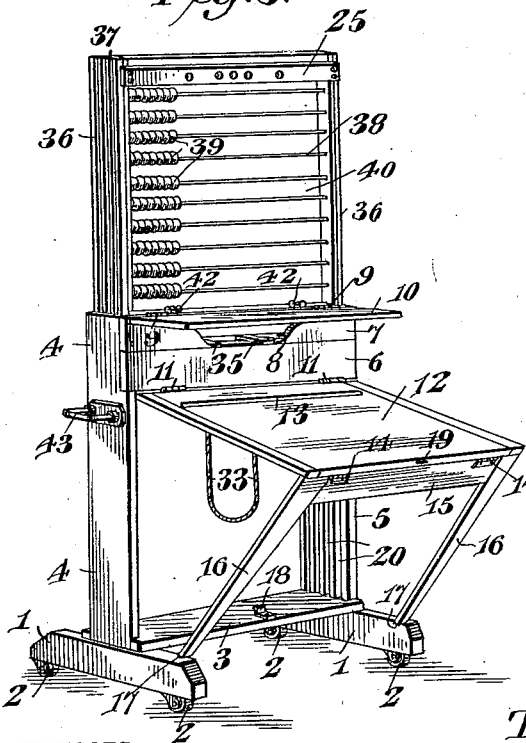
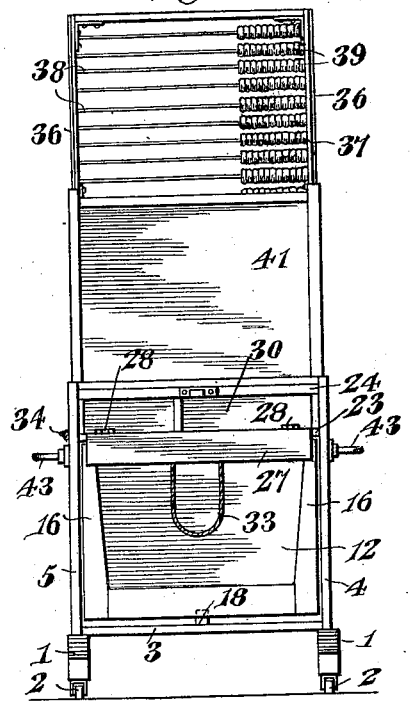
Tadeus Winiecki, INVENTOR

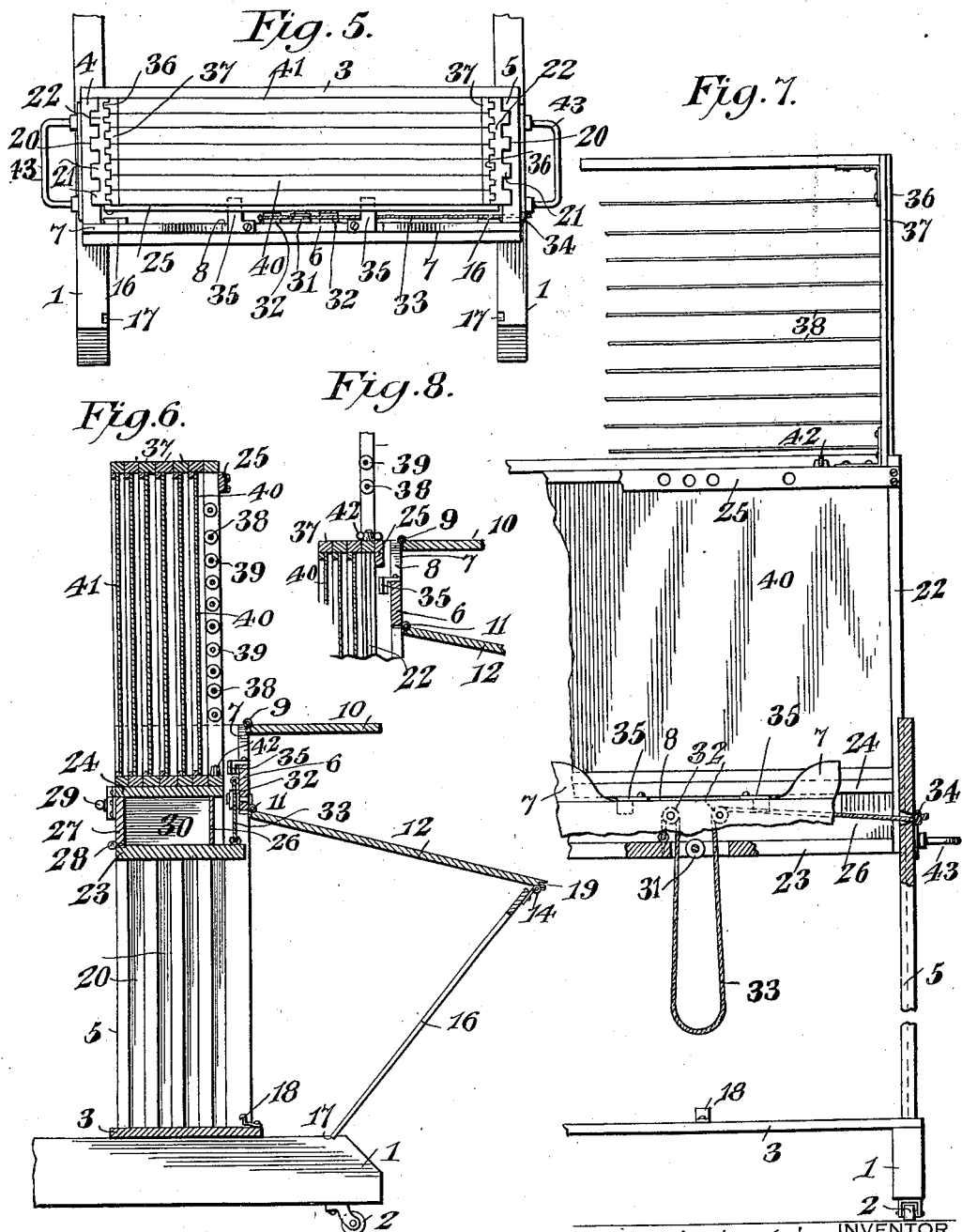

UNITED STATES PATENT OFFICE.

TADEUS WINIECKI, OF RAYMOND, WASHINGTON.

EDUCATIONAL APPLIANCE.

1,142,651. Specification of Letters Patent. Patented June 8, 1915.

Application filed October 10, 1913. Serial No. 794,484.

*To all whom it may concern:*

Be it known that I, TADEUS WINIECKI, a citizen of the United States, residing at Raymond, in the county of Pacific and State of Washington, have invented a new and useful Educational Appliance, of which the following is a specification.

This invention has reference to improvements in educational appliances, and is designed to provide an appliance adapted particularly for home use in the education of children, although not necessarily limited to such particular purpose.

In accordance with the present invention there is provided a stand or support containing numerous devices useful for educational purposes, and these educational devices are so mounted in the stand that they may be individually extended into position for use or collapsed into the confines of the stand for storage, and also be unobtrusive when the appliance is not in use.

The appliance also comprises a member which when extended may be used as a writing desk and when collapsed or folded constitutes a cover member for certain parts.

The educational devices are mounted in telescoping relation in a slide which in turn telescopes in the stand, so that the educational devices which may be arranged for teaching different things, such as arithmetic, geography, history, writing, etc., are movable independently one of the other in an up and down direction in the main slide carrying them, so that any one of the educational devices may be lifted into view for use or several of the educational devices may be so lifted, but in such case the number which may be used at one time is limited since the educational devices are relatively thin structures arranged in a series extending from front to rear of the appliance. Because of the telescoping arrangement of the slide carrying the series of independently movable educational devices the whole series may be lifted with the slide as high as the upward travel of the slide, and then any one or more of the educational devices may be lifted to a greater height independently of the slide and of each other.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a perspective view of the educational appliance in the closed or collapsed position. Fig. 2 is a similar view but with the desk portion extended. Fig. 3 is a view similar to Fig. 2 but with the slide and parts carried thereby elevated. Fig. 4 is a rear elevation with the desk closed, the slide elevated and the educational elements still more elevated. Fig. 5 is a plan view of the structure as seen in Fig. 1. Fig. 6 is a vertical front to rear elevation of the structure as seen in Fig. 3 with the slide slightly below its full elevated position. Fig. 7 is a front elevation partly in section and with parts omitted of the device in the full extended position and also showing some parts broken away. Fig. 8 is a fragmentary vertical front to rear section showing the manner of upholding an elevated educational member.

Referring to the drawings, there is shown a structure provided with two spaced parallel base members 1, each mounted upon casters 2, and which two members are connected by an intermediate cross piece 3. Erected upon the base members 1 are upright side members 4, 5, respectively, connected near the upper ends by a cross piece 6 and between the top edge of the cross piece 6 and the tops of the side members 4 and 5 are filling pieces 7 separated at their inner ends by a space 8, the purpose of which will hereinafter appear. Secured to the filling-in pieces 7 by hinges 9 is a top member 10 which when the parts are all assembled and collapsed rests upon the upper ends of the side members 4 and 5 and thereby constitutes a protecting cover for the parts inclosed in the casing formed by the side members 4 and 5 and cross pieces 3 and 6, as well as other parts to be described. The hinges 9 permit the turning of the top 10 in a direction whereby it will extend outwardly from the filling-in pieces 7 and corresponding face of the casing to constitute a shelf which may be used for different purposes, as will hereinafter appear.

Secured to the lower edge of the cross pieces 6 by hinges 11 is a desk top or leaf 12 of a size to reach about to the bottom piece 3 from the top piece 6, and therefore form a closure for the corresponding part of the casing. This desk top 12 may be constructed in any suitable manner and may, as is customary, be formed with a cross groove 13 for the reception of penholders or pencils or other articles when the desk top is in the operative position. Secured to the free or outer edge of the desk top by hinges 14 is a supporting structure composed of a cross piece 15 and legs 16 which may be folded against the inner or lower face of the desk top, while the free ends of the legs 16 are of a length to engage in notches 17 or with other stop devices or arrangements on an appropriate part of the base pieces 1, whereby the desk top when extended is supported at an appropriate angle for convenience of use. In order to hold the desk top in the closed or pendent position a catch 18 is attached to the cross piece 3 to engage in a coacting recess 19 in the free or outer edge of the desk top. The parts 18 and 19 may be taken as indicative of any appropriate means for holding the desk top in the collapsed or pendent position.

The inner walls of the uprights or side members 4 and 5 are formed or provided with upright grooves 20 which may be in relatively close parallel relation and engaging in these grooves are corresponding tongues 21 on end members 22 of slides, these end members being connected together by cross strips 23, 24 near the lower ends, but in spaced relation, while near the tops the end members 22 are connected together by a strip 25 serving not only to hold them in fixed relation one to the other, but having another purpose which will hereinafter appear. The strip 25 is secured to those edges of the end members 22 toward the desk side of the device. The two members 23 and 24 have a partition 26 between them adjacent to the desk side, while between them at the other side there is lodged a door 27 connected at one edge to the member 23 by hinges 28 and normally held closed by a latch 29 engaging the other member 24. The two members 23 and 24 with the partition 26 and door 27 include a chamber 30 which may serve for the storage of various articles, such as erasers, pointers, rulers, chalk, etc., to be used with the educational device.

The slide made up of the end members 22 and connecting parts 23, 24 and 25 may be moved up and down in the casing between the members 4 and 5 being guided by the tongues 21 and grooves 20. To accomplish this the bottom cross piece 23 of the slide is provided with a pulley 31 and other pulleys 32 are mounted on the inner face of the cross strip 6. A cord or strand 33 is made fast to the cross piece 23 and from thence is carried about the pulleys 32, 31 and 32 and finally out through the upright 5 near the top thereof, where it may be knotted, as indicated at 34, or be provided with some means preventing its being drawn into the inside of the casing. The cord or strand serves as a ready means for lifting the slide, and when this slide has been lifted to the desired height it may be there held by pivoted latch members 35 mounted on the cross piece 6 and movable so as to engage under the cross piece 24 of the slide when the latter is elevated, and thus maintain it in the lifted position. When it is desired to lower the slide with the parts to be described carried thereby, it is simply done by slightly elevating the slide by drawing on the cord 33, and then the latches 35 are moved out of the path of the slide by the hand of the operator introduced through the opening 8, after which the cord may be gently released and the slide will fall by gravity to its lowermost or collapsed position telescoping into the main casing of the structure. The inner walls of the end members 22 of the slide are formed with a suitable number of grooves for the reception of tongues 36 on the side members of relatively thin or flat frames 37, each of which frames is provided with some appropriate means for teaching. For instance, one frame has cross rails 38 with counters 39 mounted thereon, thereby forming an abacus. Other frames have partitions 40 therein upon which may be displayed such information as is desired, say, maps of various kinds, or any appropriate reading matter, while other frames may have partitions 41 finished to serve as blackboards. The abacus partition is shown as provided with wing buttons 42 which when the frame is at its most elevated position with relation to the slide may be turned in a manner to engage over the strip 25, as shown in Fig. 8, thereby holding the abacus frame in such elevated position, whether the slide be in its telescoped relation to the casing or be lifted therefrom. Similar means may be employed for the other frames. Each frame 37 with the teaching means carried thereby forms an educational device mounted in the main slide, carried by the main frame or casing, for telescoping movement in the main slide independently of the other telescoping educational devices which are all arranged in the main slide in close parallel relation, forming thereby a front to rear series in which the individual members are of substantially the same width and height. The abacus slide and those slides containing information may be readily manipulated or observed from the desk side of the device, while the blackboard slides may be readily used from the other side of the device.

When the appliance is in the full collapsed position and the cover member or shelf 10 is moved into covering relation to the frames 37, the parts are all hidden, except the outer face of the desk top which forms a front for the device and the rear frame 37 with the door 27 which forms the back of the device, while handles 43 on the side members 4 and 5 serve as convenient means for moving the appliance from place to place, as desired.

The educational appliance may be made as ornamental in appearance as may be wished.

When the appliance is used for children of relatively small stature, especially with relation to the blackboards, the main slide need not be raised, but for other purposes it is desirable that the main slide be raised and the educational elements be lifted above the main slide to the full height. These are features, however, which will depend upon the particular use to which the appliance is put, and in any event those portions of the appliance other than the desk which are to be used by children may be so used while the child stands, thus avoiding any cramped or uncomfortable position and causing the child to use the eyes on a close approach to a level.

What is claimed is:—

1. An educational appliance comprising a stand or casing, an upright telescoping slide mounted therein, and a plurality of educational devices carried by and telescoping in the slide and movable independently of each other up out of and down into the slide in the same progressive direction as the movements of the slide out of and into the stand.

2. An educational appliance comprising an upright support or casing, a slide mounted in the casing and movable upwardly through the top thereof, and a front to rear series of educational devices of substantially the same width and height mounted in the slide for movement therewith and each also movable independently of the other upwardly through the top of the slide to a greater elevation than said slide.

3. An educational appliance comprising a support or casing, a telescoping slide mounted therein, telescoping educational devices mounted in and movable with the slide and also independently thereof and of each other in the same progressive direction as the slide, slide elevating and lowering means connected to both the slide and casing and accessible exterior to the casing, and means for locking the slide in the elevated position.

4. An educational appliance comprising a stand or casing having upright ends, a telescoping slide mounted in the casing and having end members in guided relation to the upright ends of the stand, and a front to rear series of frames carried by the slide in guided relation thereto and each carrying educational means, each frame being movable independently of the others in telescoping relation to the slide through the top of the latter and said slide being movable in telescoping relation to the casing.

5. An educational appliance comprising a casing with telescoping educational devices mounted therein and below the top of the casing when in the retracted position, said educational devices being movable through the top of the casing into elevated observable position, a desk structure carried by the casing and normally flat thereagainst in side covering relation to the retracted educational devices and movable with relation to the casing into extended useful position, and a top member for the casing mounted for movement either into overlying relation to the retracted educational device or into laterally projecting relation to the casing on the desk side thereof to then serve as a shelf overlying the desk in elevated spaced relation thereto when said desk is extended.

6. An educational appliance comprising desk members, spaced uprights thereon with grooved inner faces, a slide having tongues adapted to the grooves in the uprights and in turn provided with grooves on the inner faces, and individual educational devices having tongues adapted to the grooves on the inner faces of the slide, said slide being open at the upper end for the elevation of the educational devices above it.

7. An educational appliance comprising a basic member with spaced uprights and a cross connection near the upper ends of the uprights, filling-in members on the cross connection with their inner ends spaced apart, a slide mounted between and movable above the uprights and said uprights and slide having coactive guiding means, a series of frames mounted in the slide for individual movement above said slide and carrying educational devices, holding members carried by the cross connection of the side members and movable into and out of sustaining relation to the slide when elevated, and coacting means on the slide and educational devices for holding them in the elevated position with respect to the slide.

8. An educational appliance comprising basic members, uprights thereon in spaced relation having guiding means on their inner faces, cross members for holding the uprights in spaced relation, a cover member in hinged relation to the upper end of the uprights and movable thereover and also into projecting relation thereto to constitute a shelf, a desk top in hinged relation to one of the cross members and movable into closing relation to the corresponding part of the uprights, said desk top having supporting means carried thereby and foldable against the rear face thereof, a slide mounted between the uprights and having coacting guiding means related to those of the uprights, flexible strand and pulley connections for the slide to elevate the latter above the uprights, means for holding the slide in the elevated position, and educational devices in the form of a series of frames mounted in the slide in telescoping relation thereto, each educational device being separately movable with relation to the others into elevated relation to the slide and all of the educational devices participating in the movements of the slide.

In testimony that I claim the foregoing as my own, I have hereto affixed my signature in the presence of two witnesses.

TADEUS WINIECKI.

Witnesses:
J. A. KIRKMAN,
EDW. E. STEWART.

Copies of this patent may be obtained for five cents each, by addressing the "Commissioner of Patents, Washington, D. C."